United States Patent [19]
Ishiwata et al.

[11] Patent Number: 5,592,915
[45] Date of Patent: Jan. 14, 1997

[54] PILOT INJECTION CONTROLLER IN FUEL INJECTION SYSTEM AND METHOD OF CONTROLLING PILOT INJECTION QUANTITY

[75] Inventors: Hiroshi Ishiwata; Takashi Ohishi; Nobuhiro Kitahara, all of Saitama Prefecture, Japan

[73] Assignee: Zexel Corporation, Japan

[21] Appl. No.: 536,988

[22] Filed: Sep. 29, 1995

[30] Foreign Application Priority Data

Sep. 30, 1994 [JP] Japan .................................. 6-259694

[51] Int. Cl.⁶ .................................................. F02M 37/04
[52] U.S. Cl. .......................... 123/300; 123/496; 123/501
[58] Field of Search .................................. 123/299, 300, 123/373, 500, 501, 357, 369, 496

[56] References Cited

U.S. PATENT DOCUMENTS

| | | | |
|---|---|---|---|
| 2,871,796 | 2/1959 | Dreisin | 123/299 |
| 2,960,079 | 11/1960 | Monnot | 123/299 |
| 3,698,373 | 10/1972 | Nagasawa | 123/300 |
| 3,827,419 | 8/1974 | Isomura | 123/300 |
| 4,619,233 | 10/1986 | Yamaguchi | 123/500 |
| 4,630,586 | 12/1986 | Guntert | 123/500 |
| 4,754,737 | 7/1988 | Ishida | 123/500 |

FOREIGN PATENT DOCUMENTS

| | | | |
|---|---|---|---|
| 0092328 | 7/1981 | Japan | 123/501 |
| 0031627 | 2/1986 | Japan | 123/500 |
| 62-55436 | 3/1987 | Japan . | |
| 0077744 | 3/1989 | Japan | 123/300 |
| 0264149 | 10/1990 | Japan | 123/500 |
| 3233142 | 10/1991 | Japan . | |

*Primary Examiner*—Carl S. Miller
*Attorney, Agent, or Firm*—Ostrolenk, Faber, Gerb & Soffen, LLP

[57] ABSTRACT

A pilot injection controller and a method of controlling pilot injection quantity enable the quantity of fuel pilot-injected fuel by an internal combustion engine fuel injection system of the type in which the fuel delivery stroke for pilot injection is fixed to be maintained substantially constant irrespective of engine speed by controlling prestroke such that the utilized portion of a cam is shifted to a lower delivery velocity region thereof with increasing engine speed, the principle involved being that the quantity of fuel pilot-injected by a fuel injection system is proportional to the actual plunger delivery velocity and the fact that since the actual delivery velocity is proportional to the product of the cam velocity constant and the cam rotational speed the actual delivery velocity can be maintained substantially constant by increasing the cam velocity constant in the low speed region and decreasing the cam velocity constant in the high speed region.

17 Claims, 11 Drawing Sheets

PILOT INJECTION CONTROLLER IN FUEL INJECTION SYSTEM AND METHOD OF CONTROLLING PILOT INJECTION QUANTITY

BACKGROUND OF THE INVENTION

1. Field of the Invention

This invention relates to a pilot injection controller in an internal combustion fuel injection system and a method of controlling the quantity of pilot-injected fuel, more particularly to a pilot injection controller in a fuel injection system with a fixed pilot injection plunger delivery stroke wherein optimum quantity of pilot-injected fuel can be achieved over a wide range of engine speeds by controlling the plunger delivery velocity and to a method of controlling the quantity of pilot-injected fuel therewith.

2. Prior Art

Prior art engine fuel injection systems use a cam connected with the engine to reciprocate each plunger for delivering fuel to the associated combustion chamber. As taught by Japanese Patent Public Disclosure Sho 62-55436, for example, some fuel injection systems of this type reduce combustion noise and generation of oxides of nitrogen (NOx) by preceding the main fuel injection with a pilot fuel injection which injects a smaller quantity of fuel than the main fuel injection.

The desired quantity of pilot-injected fuel is, for example, generally about 5 $mm^3$. In a fuel injection system in which the delivery stroke of the plunger for pilot injection has a fixed pilot injection delivery stroke, however, the quantity of pilot-injected fuel varies greatly with the speed of the engine or cam.

Specifically, the quantity of pilot-injected fuel in the low-speed region is zero or at any rate very small owing to the small delivery energy, while it becomes large in the high-speed region owing to the dynamic effect and/or the preflow effect, so that in extreme cases the pilot injection may continue into the main injection and make it impossible to achieve the purpose of the pilot injection.

In a fuel injection system in which the quantities of fuel injected in the main and pilot injections are both electronically controlled (as described in Japanese Patent Public Disclosure Hei 3-233142, for example), the quantity of pilot-injected fuel can be appropriately controlled by appropriately opening and closing a solenoid valve in response to the engine speed, cam speed and/or other operating conditions. On the negative side, however, the system becomes complex, large and expensive, while the desired rapid control cannot always be achieved in actual operation because of problems with the opening-closing response of the solenoid valve.

Although constituting a fuel injection system to enable mechanical instead of electronic control of the quantity of pilot-injected fuel would enable structural simplification and avoid cost increase, it would lead to problems particularly in the case of a fuel injection system of the type in which the fuel delivery stroke for pilot injection is fixed (cannot be varied at as desired). Specifically, since, as explained in the foregoing, the quantity of pilot-injected fuel varies with engine speed, it would become difficult to achieve a sufficient pilot injection quantity in the low speed region.

This invention was completed in the light of the foregoing problem and has as one object to provide a pilot injection controller in a fuel injection system which makes it possible to obtain a constant quantity of pilot-injected fuel over a wide range of engine speeds and a method of controlling the quantity of pilot-injected fuel therewith.

Another object of the invention is to provide a pilot injection controller in a fuel injection system which enables optimization of the quantity of pilot-injected fuel over a wide range in a fuel injection system of the type in which the fuel delivery stroke for pilot injection is fixed and a method of controlling the quantity of pilot-injected fuel therewith.

Another object of the invention is to provide a pilot injection controller in a fuel injection system which enables optimization of the quantity of pilot-injected fuel over a wide range by controlling the actual delivery velocity of a plunger to a fixed value and a method of controlling the quantity of pilot-injected fuel therewith.

SUMMARY OF THE INVENTION

This invention was accomplished based particularly on the knowledge that the quantity of fuel pilot-injected by a fuel injection system is proportional to the actual delivery velocity of the plunger, that since the actual delivery velocity is proportional to the product of the cam velocity constant (angular derivative of cam lift) and the cam rotational speed the actual delivery velocity can be maintained substantially constant by increasing the cam velocity constant in the low speed region and decreasing the cam velocity constant in the high speed region, and that in a fuel injection system enabling variable prestroke control the cam velocity constant can be varied by controlling the prestroke. Thus the first aspect of the invention provides a pilot injection controller in a fuel injection system including a cam rotated by an engine, a plunger barrel with a fuel compression chamber, a plunger reciprocated inside the plunger barrel by the cam for sucking fuel into the fuel compression chamber from a fuel reservoir through a fuel suction and discharge hole and delivering the fuel under pressure and a control sleeve fitted over the plunger to be slidable thereon in an axial direction of the plunger, the plunger executing a pilot injection delivery stroke of fixed magnitude to pilot-inject fuel prior to main injection of fuel the pilot injection controller comprising means for adjusting prestroke by changing a positional relationship in the axial direction between the control sleeve and the plunger, and means for enabling the prestroke adjustment by the prestroke adjustment means to cause a portion of the cam in a lower delivery velocity region to be used with increasing rotational speed of the cam.

The invention further encompasses the concept of forming the outer surface of the plunger with an inclined control groove for communicating with the fuel suction and discharge hole thereof, forming the control sleeve with a main injection cutoff port at a position aligned with the inclined control groove in the axial direction of the plunger, forming the outer surface of the plunger with a pilot spill slit extending annularly over a prescribed length at a position below both the fuel suction and discharge hole and the inclined control groove of the plunger for communicating with at least one of the fuel suction and discharge hole and the inclined control groove, and forming the control sleeve separately of the main injection cutoff port with a pilot injection cutoff port at a position aligned with the pilot spill slit in the axial direction of the plunger.

The cam can be a concave cam.

The second aspect of the invention provides a method of controlling pilot injection quantity in a fuel injection pump system including a cam rotated by an engine, a plunger barrel with a fuel compression chamber, a plunger reciprocated inside the plunger barrel by the cam for sucking fuel into the fuel compression chamber from a fuel reservoir through a fuel suction and discharge hole and delivering the fuel under pressure and a control sleeve fitted over the plunger to be slidable thereon in an axial direction of the plunger, the plunger executing a pilot injection delivery stroke of fixed magnitude to pilot-inject fuel prior to main injection of fuel, the method comprising a step of adjusting prestroke by changing a positional relationship in the axial direction between the control sleeve and the plunger, and a step of enabling the prestroke adjustment to cause a portion of the cam in a lower delivery velocity region to be used with increasing rotational speed of the cam.

The change in fuel injection timing caused by the prestroke adjustment can be compensated for by a timer.

The pilot injection controller in a fuel injection system and the method of controlling pilot injection quantity according to this invention are constituted such that the utilized portion of the cam is shifted to a lower delivery velocity region thereof with increasing engine or cam velocity, meaning, in other words, that a high delivery velocity region of the cam can be utilized even when the engine or cam velocity is low, and, therefore, the actual delivery velocity of the plunger, which is proportional to the product of the velocity constant and the rotational speed of the cam, can be maintained constant over a wide range of engine speeds, whereby the quantity of pilot-injected fuel can be maintained constant within the desired range thereof.

Moreover, since the variable prestroke controller of the fuel injection pump system is adopted as the mechanism for enabling selection of the utilized region (velocity constant) of the cam for controlling the quantity of pilot-injected fuel, the quantity of pilot-injected fuel can be controlled simply and cheaply without need for a complex and costly electronic control system.

DETAILED DESCRIPTION OF THE PREFERRED EMBODIMENTS

A first embodiment of the pilot injection controller in an engine fuel injection system and the method of controlling the quantity of pilot-injected fuel therewith will be explained with reference to FIGS. 1 to 6.

Figure 1:
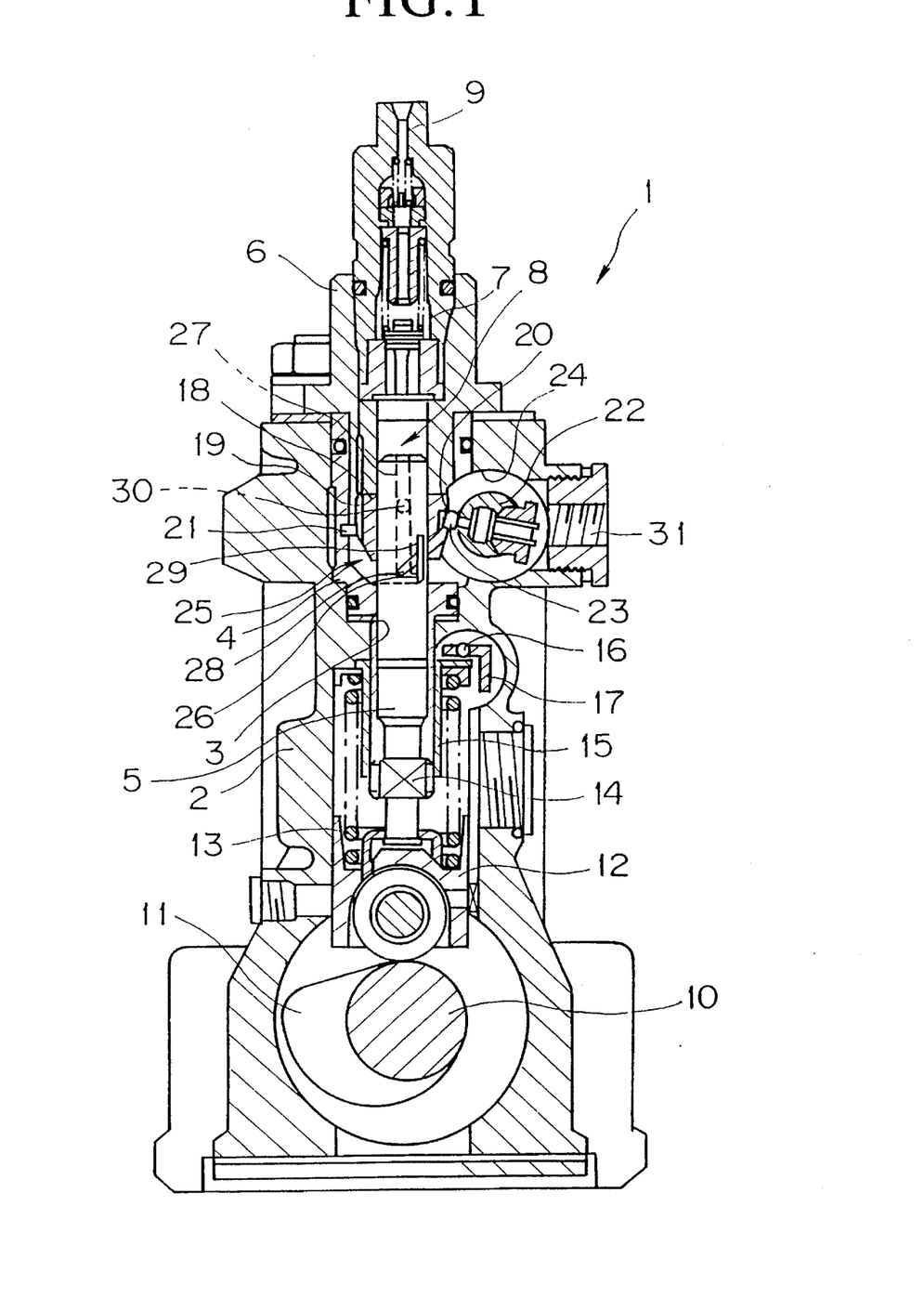
FIG. 1 is a longitudinal sectional view of a fuel injection system 1 equipped with a variable prestroke controller, this view being used to explain a first embodiment of the pilot injection controller 54 for a fuel injection system according to the invention.

FIG. 1 is a vertical sectional view of a fuel injection pump (fuel injection system) 1 with variable prestroke controller. The fuel injection system 1 comprises a pump housing 2 formed with as many vertical bores 3 (only one shown) as the engine has cylinders. Inside each vertical bore 3, a lower plunger barrel 4 is fitted in and fixed to the pump housing 2 and a plunger 5 is inserted into the lower plunger barrel 4 to be free to rotate and move up and down therein.

The upper end of the plunger 5 extends into an upper plunger barrel 6 fixed to the pump housing 2 via the lower plunger barrel 4. A delivery valve 7 is disposed inside the upper plunger barrel 6 such that a fuel compression chamber 8 is established between it and the plunger 5. The upper end of the delivery valve 7 is formed with a fuel outlet 9.

The lower end of the plunger 5 abuts on a tappet 12 riding on a cam 11 mounted on a camshaft 10. The camshaft 10 is connected with and rotated by the engine (not shown). The plunger 5 is maintained in contact with the cam 11 via the tappet 12 by a spring 13 so as to reciprocate vertically (as seen in FIG. 1) as the cam 11 rotates together with-the camshaft 10.

The plunger 5 is further formed with a driving face 14 engaged with a sleeve 15 for adjusting the quantity of injected fuel. The sleeve 15 is further engaged with a projection 16 which is in turn engaged with a rod 17 for adjusting the quantity of injected fuel. The rod 17 is linked with the accelerator pedal (not shown) to be driven normal to the drawing sheet as the accelerator pedal is depressed and released. As a result, the sleeve 15 rotates the plunger 5 in proportion to the amount of accelerator pedal depression.

Thus the effective pressurization stroke for fuel injection (the main injection explained later) can be adjusted by the rotation of the plunger 5 produced by the rod 17.

In addition, a control sleeve 18 is fitted over the upper end of the plunger 5 to be slidable thereon. The control sleeve 18 is formed on its left side in FIG. 1 with a vertical guide groove 19 and on its right side in the same drawing with a lateral engagement groove 20. A guide pin 21 formed on the lower plunger barrel 4 is fitted into the guide groove 19 and an engagement pin or other such engagement member 23 of a timing control rod 22 is fitted into the engagement groove 20.

The timing control rod 22 is rotatably supported within a lateral bore 24 of the pump housing 2 by bearings (not shown).

In the case of an electronic control system, the timing control rod 22 is connected with and rotated by a step motor or other such actuator (not shown).

The prestroke can be adjusted by rotating the timing control rod 22 so as to raise and lower the control sleeve 18.

Figure 2:
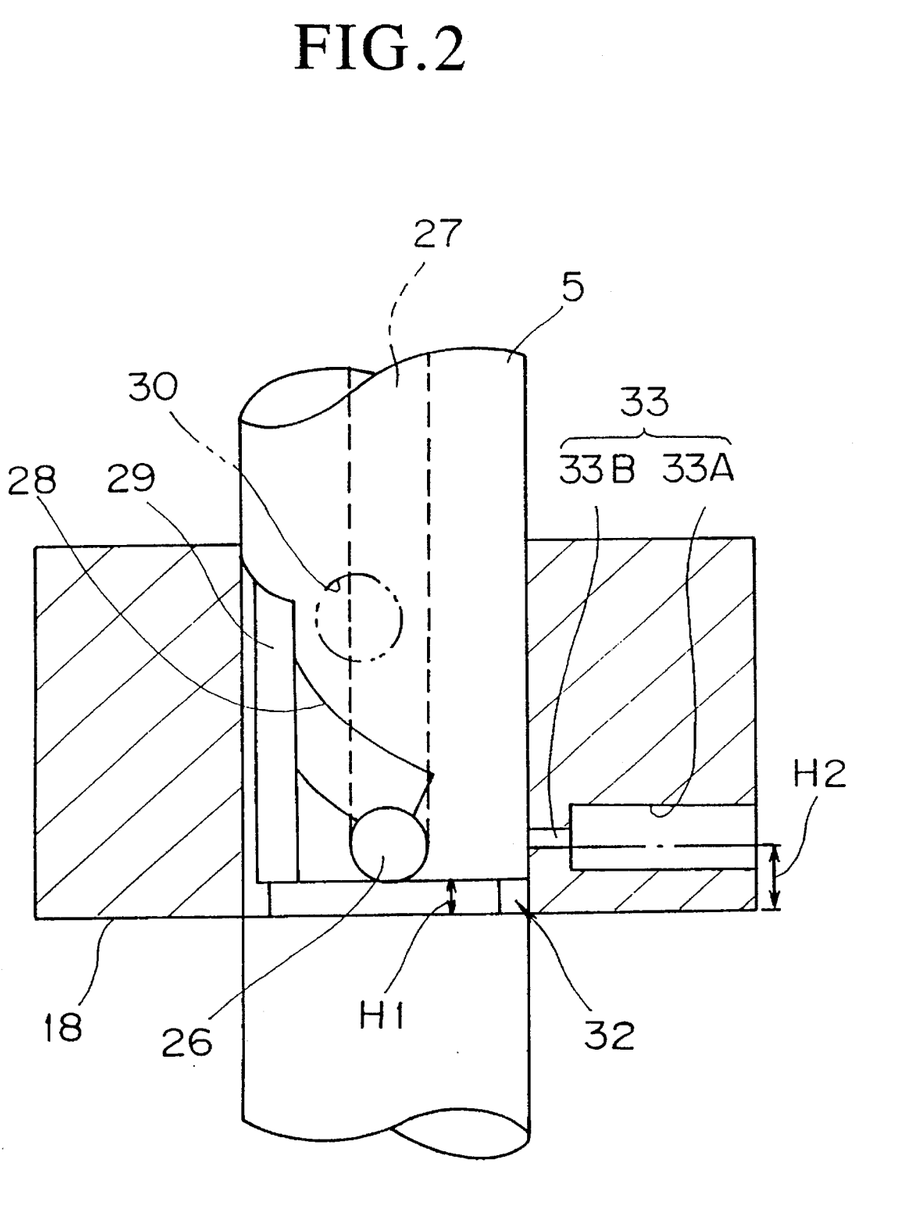
FIG. 2 is an enlarged sectional view of an essential portion of the fuel injection system in its state at the start of pilot injection.

More specifically, rotating the timing control rod 22 clockwise (forward) or counterclockwise (backward) as seen in FIG. 2 causes the engagement member 23 of the timing control rod 22 to rotate together therewith. This rotation of the engagement member 23 moves the control sleeve 18 vertically, thus changing the relative vertical positional relationship between the plunger 5 and the control sleeve 18.

As a result, the prestroke of the plunger 5, i.e. the distance between the control sleeve 18 and the position of a fuel suction and discharge hole 26 (explained later) when the plunger 5 is at its bottom dead point, can be adjusted.

More specifically, the distance traveled by the plunger 5 between its the bottom dead point and the point at which the fuel suction and discharge hole 26 is closed is the plunger 5 prestroke and the time that the fuel suction and discharge hole 26 is closed marks the start of the main fuel injection.

When the timing control rod 22 is rotated clockwise to raise the control sleeve 18, the prestroke becomes greater and the start of the main fuel injection is delayed (injection retard). This makes it possible to obtain a high injection rate (quantity of injected fuel per unit rotation angle of the camshaft 10, namely the rate of change in the quantity of injected fuel with time) suitable for the low engine speed range.

When the timing control rod 22 is rotated counterclockwise, on the other hand, the control sleeve 18 moves down to shorten the prestroke. The injection thus occurs earlier (injection advance) so that a lower injection rate suitable for the high engine speed range is obtained.

The plunger 5 slidably accommodated in the lower plunger barrel 4 is moved reciprocally within the lower plunger barrel 4 and the upper plunger barrel 6 by the rotation of the engine applied thereto through the camshaft 10 and the cam 11. As a result, fuel is drawn into the fuel compression chamber 8 from a fuel reservoir 25 and is then forced out of the fuel outlet 9 and through a fuel injection tube (not shown) to the associated fuel injection nozzle (not shown).

More specifically, the plunger 5 has the fuel suction and discharge hole 26 which extends radially and constitutes a fuel suction port opening into the fuel reservoir 25, a central communicating hole 27 formed axially at its center so as to communicate the fuel suction and discharge hole 26 with the fuel compression chamber 8, an inclined control groove 28 formed in its outer surface, and a vertical groove 29 for communicating the inclined control groove 28 with the opening of the fuel suction and discharge hole 26.

In addition, the control sleeve 18 slidably fitted on the plunger 5 is formed with a main injection cutoff port 30 which passes radially therethrough.

The main injection cutoff port 30 is disposed at a position in the vertical direction which enables it to communicate with the inclined control groove 28 depending on the up and down movement of the plunger 5.

The fuel reservoir 25 communicates with a fuel inlet 31 through the lateral bore 24 formed in the pump housing 2.

While the inclined control groove 28 is provided on the plunger 5 and the main injection cutoff port 30 is provided on the control sleeve 18 for use in main injection, in addition, as shown in the enlarged view of FIG. 2, the plunger 5 is further formed with a pilot spill slit 32 and the control sleeve 18 is further formed with a pilot injection cutoff port 33 for use in pilot injection.

As shown in FIG. 2, the pilot spill slit 32 of the plunger 5 is formed at a lower position than the fuel suction and discharge hole 26, the central communicating hole 27, the inclined control groove 28 and the vertical groove 29 and can communicate with one of these.

The pilot spill slit 32 is formed across the outer surface of the plunger 5 to a prescribed length, which may equal the full circumference of the plunger or a prescribed length within the range of rotation of the plunger 5, and is formed annularly in a plane (horizontal plane) perpendicularly to the axis of the plunger 5.

The pilot injection cutoff port 33 is formed in the control sleeve 18 at a position aligned with the position of the pilot spill slit 32 in the axial direction of the plunger 5.

The pilot injection cutoff port 33 consists of a large-diameter portion 33A and a small-diameter portion 33B and is formed at a lower part of the control sleeve 18 than the main injection cutoff port 30.

Since the width H1 of the pilot spill slit 32 is determined solely by the width of the cutter blade used to machine it and, differently from in the prior art, is not influenced by the position of the pilot spill slit 32 relative to the fuel suction and discharge hole 26, the widths H1 of the pilot spill slits 32 can be machined in the plungers 5 for the respective cylinders with high precision (without variance) and at low cost.

The amount of fuel leakage during the pilot stroke increases with increasing volume of the pilot spill slit 32. Therefore, when the pilot spill slit 32 is made long, for example, when it is formed over the full circumference of the plunger 5, the resulting increase in its volume causes an increases in the amount of fuel leakage and, accordingly, a reduction in the quantity of pilot-injected fuel for the same pilot stroke.

In other words, a larger pilot stroke can be adopted for obtaining the same quantity of pilot-injected fuel, which in turn has the effect of reducing variance in the quantity of pilot-injected fuel among the different cylinders.

The operation of the so-configured fuel injection system 1 will now be briefly explained.

Shortly after the plunger 5 begins its rise from the bottom dead point, the fuel suction and discharge hole 26 becomes open to the fuel reservoir 25. Since the fuel reservoir 25 and the fuel compression chamber 8 are in communication through the fuel suction and discharge hole 26 and the central communicating hole 27, the pressure of the fuel in the fuel compression chamber 8 does not increase and, therefore, the delivery valve 7 remains closed.

FIG. 2 shows the situation at the start of pilot injection during the actual delivery of fuel. Here the plunger 5 has risen to the point where the lower edge of the pilot spill slit 32 is closed by the lower edge of the control sleeve 18. As a result, the pressure of the fuel in the fuel compression chamber 8 rises until it reaches a level higher than the valve-opening pressure of the delivery valve 7, at which time the delivery valve 7 opens. The fuel therefore issues from the fuel outlet 9 (delivery of pressurized fuel), marking the start of pilot injection.

With further rise of the plunger 5, the pilot spill slit 32 comes into communication with the small-diameter portion 33B of the pilot injection cutoff port 33 of the control sleeve 18, whereby the fuel in the fuel compression chamber 8 spills into the fuel reservoir 25 to terminate the pilot injection.

The length of the delivery stroke for pilot injection is thus fixed at the value (H2–H1) obtained by subtracting the width H1 of the pilot spill slit 32 from the distance H2 between the lower edge of the control sleeve 18 and the lower edge of the large-diameter portion 33A.

Then, as the plunger 5 continues to rise, the communication of the pilot spill slit 32 with the small-diameter portion 33B of the pilot injection cutoff port 33 is closed off, once again sealing the fuel compression chamber 8. This marks the start of main injection.

The main injection is thereafter terminated when the inclined control groove 28 aligns with the main injection cutoff port 30.

More specifically, with further rise of the plunger 5 the inclined control groove 28 that was in communication with the fuel suction and discharge hole 26 comes into communication with the main injection cutoff port 30 of the control sleeve 18, thus bringing the main injection cutoff port 30 in communication with the fuel compression chamber 8 via the inclined control groove 28, the vertical groove 29, the fuel suction and discharge hole 26 and the central communicating hole 27. As a result, the fuel in the fuel compression chamber 8 escapes to the fuel reservoir 25, lowering the fuel pressure in the fuel compression chamber 8 to the point where the delivery valve 7 closes to terminate the injection (the delivery of pressurized fuel).

Then when the plunger 5 descends, fuel is sucked from the fuel reservoir 25 into the fuel compression chamber 8 through the fuel suction and discharge hole 26 owing to the negative pressure in the fuel compression chamber 8.

The effective pressurization stroke for the main injection can be adjusted by operating the rod 17 for adjusting the quantity of injected fuel so as to rotate the plunger 5 and thereby control the distance in the axial direction between the inclined control groove 28 and the main injection cutoff port 30.

In addition, the timing control rod 22 can be rotated in either direction to raise and lower the control sleeve 18 for adjusting the prestroke, i.e, the fuel injection timing.

Figure 3:
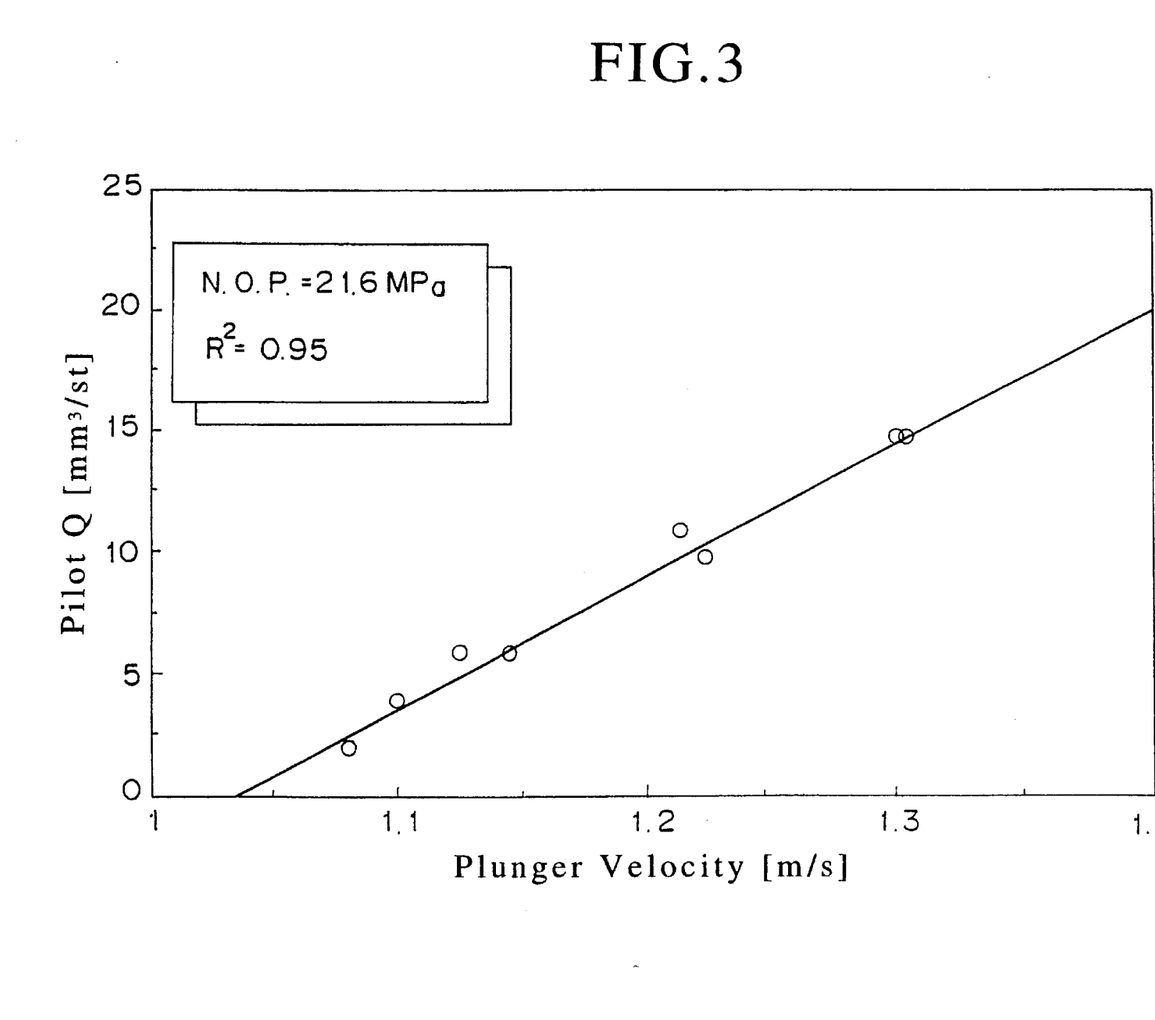
FIG. 3 is a graph showing how the quantity of pilot-injected fuel varies with the actual delivery velocity of the plunger 5 of the fuel injection system.

The graph of FIG. 3 shows how the quantity of pilot-injected fuel varies with the actual delivery velocity of the plunger 5. As shown, the relationship is substantially linear. In this figure, N.O.P stands for (fuel injection) nozzle opening pressure and $R^2$ for the contribution rate of the actual delivery velocity of the plunger 5 and the quantity of pilot-injected fuel (square of the correlation coefficient).

Since the actual delivery velocity of the plunger 5 is proportional to the product of the velocity constant and the rotational speed of the cam 11, the quantity of pilot-injected fuel can be maintained constant independently of the rotational speed by making the velocity constant of the cam 11 large in the low-speed region and small in the high-speed region.

Moreover, since controlling the velocity constant of the cam 11 is equivalent to selecting the utilized region of the cam 11 and the utilized region of cam 11 can be varied by varying the prestroke of the fuel injection system 1, it is therefore possible to maintain the quantity of pilot-injected fuel constant by controlling the prestroke so as to control the velocity constant of the cam 11 and thus control the actual delivery velocity of the plunger 5.

An example of a variable prestroke controller for changing the prestroke will now be described.

Figure 4:
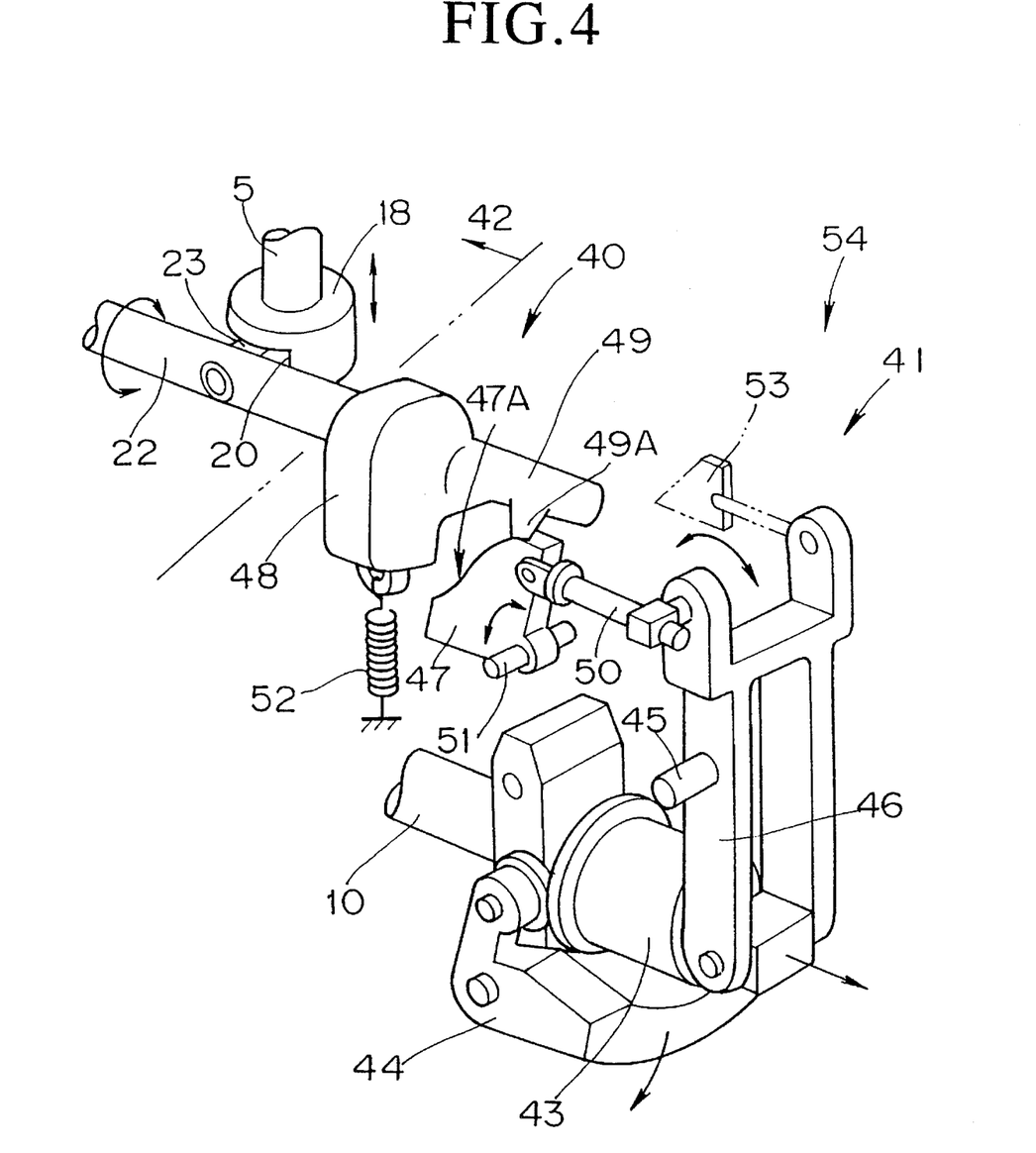
FIG. 4 is a schematic perspective view of a variable prestroke controller 40 which mechanically varies prestroke according to engine speed and a prior art mechanical governor 41.

FIG. 4 is a schematic perspective view of a variable prestroke controller 40 which mechanically varies the prestroke according to the engine speed and a prior art mechanical governor 41. On the side of a main pump unit 42 are shown the plunger 5, the control sleeve 18, and the timing control rod 22 whose engagement member 23 is engaged with the engagement groove 20 of the control sleeve 18.

On the side of mechanical governor 41, the cam shaft 10 for reciprocating the plunger 5 in the main pump unit 42 is fitted with a guide sleeve 43 and a flyweight 44 is connected with the guide sleeve 43.

A variable prestroke controller 40 constituted in the fuel injection system 1 comprises the flyweight 44, a tension lever 46 serving as a prestroke control lever which pivots around a stationary pivot shaft 45 in accordance with the movement of the flyweight 44, a timing cam 47, a counterweight 48 connected with the timing control rod 22, and a cam surface abutment piece 49 formed integrally with the counterweight 48.

The timing cam 47 is connected with one side of the free end of the tension lever 46 through a connection lever 50 and is rotatable around a stationary pivot shaft 51. A cam surface abutment projection 49A of the cam surface abutment piece 49 is pressed onto the cam surface 47A of the timing cam 47 at a prescribed pressure by the force of a counterweight spring 52 (return spring).

The other side of the free end of the tension lever 46 is connected with a torque cam 53 which is part of the mechanical governor 41. Although this is for establishing a governor mechanism for automatically controlling the quantity of fuel injected in response to variation in engine load, this mechanism will not be described in detail here.

In the fuel injection pump variable prestroke controller 40 of the aforesaid configuration, an increase in engine speed (pump speed) increases the centrifugal force of the flyweight 44 causing it to shift and slide the guide sleeve 43 along the cam shaft 10 to the right in FIG. 4. As a result, the tension lever 46 rotates about the stationary pivot shaft 45, whereby the mechanical governor 41 performs the prescribed governor function and the timing cam 47 is rotated about the stationary pivot shaft 51 by the connection lever 50.

Since this rotation of the timing cam 47 changes the positional relationship between the timing control cam surface 47A and the cam surface abutment projection 49A of the cam surface abutment piece 49, the cam surface abutment piece 49 and the counterweight 48 are rotated about the axis of the timing control rod 22.

The resulting rotation of the timing control rod 22 by a corresponding angle moves the control sleeve 18 vertically and changes the positional relationship between the control sleeve 18 and the plunger 5, thus changing the fuel injection timing or the prestroke.

Thus, as explained in the foregoing, the variable prestroke controller 40 controls the start of pressurized fuel delivery by the main pump unit 42 by varying the positional relationship in the axial direction between the control sleeve 18 and the plunger 5, the change in the position of the control sleeve 18 being achieved by operating the timing control rod 22.

The variable prestroke controller 40, the timing control rod 22, the control sleeve 18, the cam 11 etc. constitute a pilot injection controller 54 in the fuel injection pump system according to a first embodiment of this invention.

Figure 5:
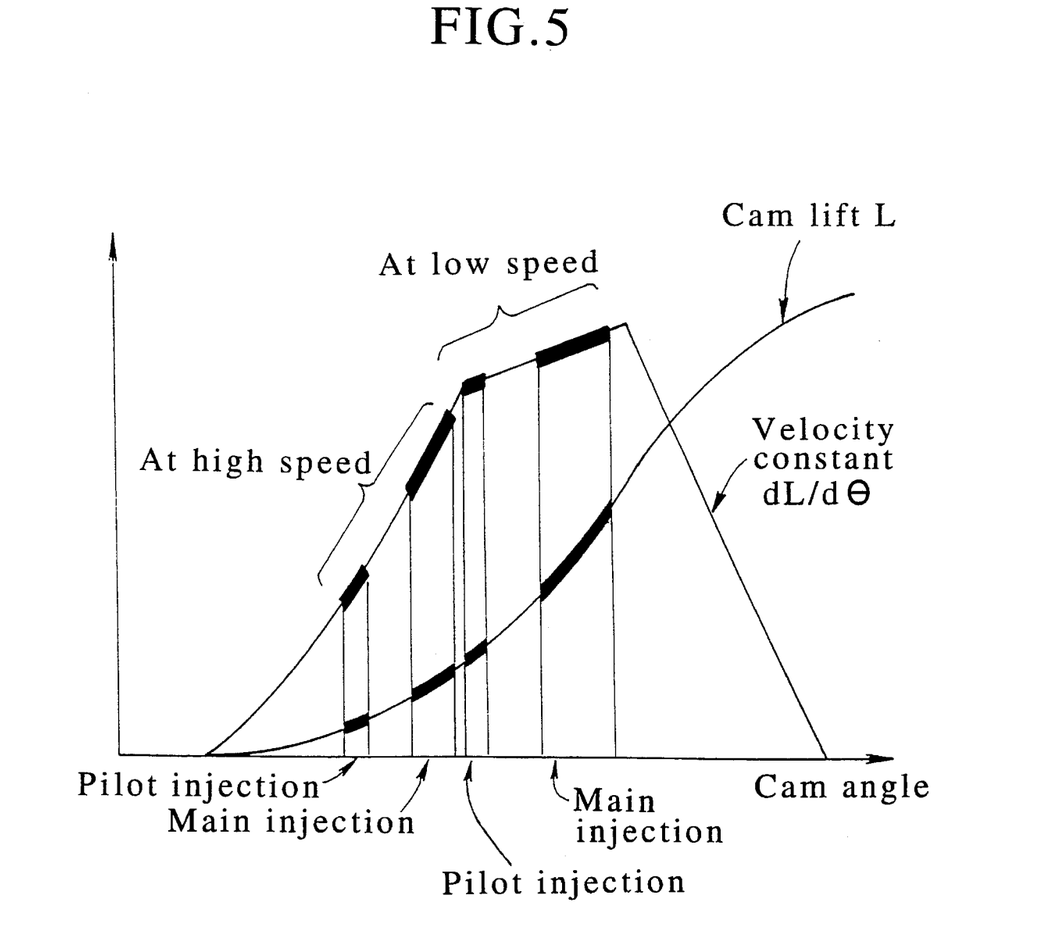
FIG. 5 is a graph showing how cam lift and cam velocity constant vary with cam angle.

FIG. 5 is a graph showing how cam lift and cam velocity constant vary with cam angle. The cam velocity constant, which is defined as the angular derivative of the cam lift L, is expressed as $dL/d\theta$.

As was explained earlier, pilot injection and main injection are conducted in the low-speed region with the prestroke increased so as to increase the velocity constant of the cam 11 and are conducted in the high-speed region with the prestroke decreased so as to utilize a further forward region of the cam lift and thus reduce the velocity constant of the cam 11.

The profile of the cam 11 is designed so as to provide the desired velocity constant in the region in which a quantity of pilot-injected fuel is required.

Therefore, the delivery velocity of the plunger 5, which is proportional to the product of the velocity constant and the rotational velocity of the cam 11, can be maintained substantially constant by selecting an appropriate combination of engine speed and cam velocity constant or utilized velocity range. Since, as was explained in connection with FIG. 3, the quantity of pilot-injected fuel varies as a function of the actual delivery velocity of the plunger 5, it is therefore possible to maintain the quantity of pilot-injected fuel substantially constant irrespective of increase/decrease in engine speed.

Figure 6:
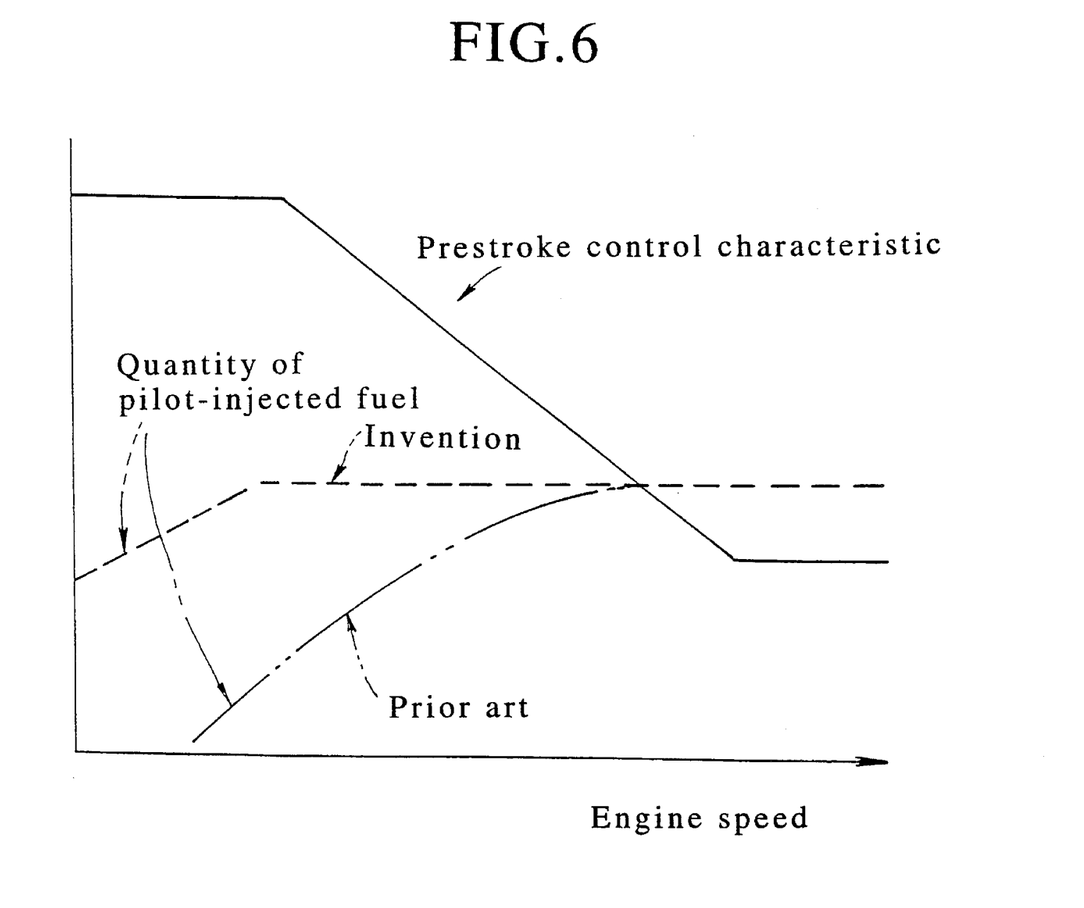
FIG. 6 is a graph showing how prestroke and pilot injection quantity control characteristics vary with engine speed.

This can be clearly seen from the graph of FIG. 6, which shows that by decreasing the prestroke with increasing engine speed (solid line) it is possible to keep the quantity of pilot-injected fuel substantially constant over a wide range of engine speeds (dashed line). (The chain line in this figure represents the quantity of pilot-injected fuel in the prior art system.)

Figure 7:
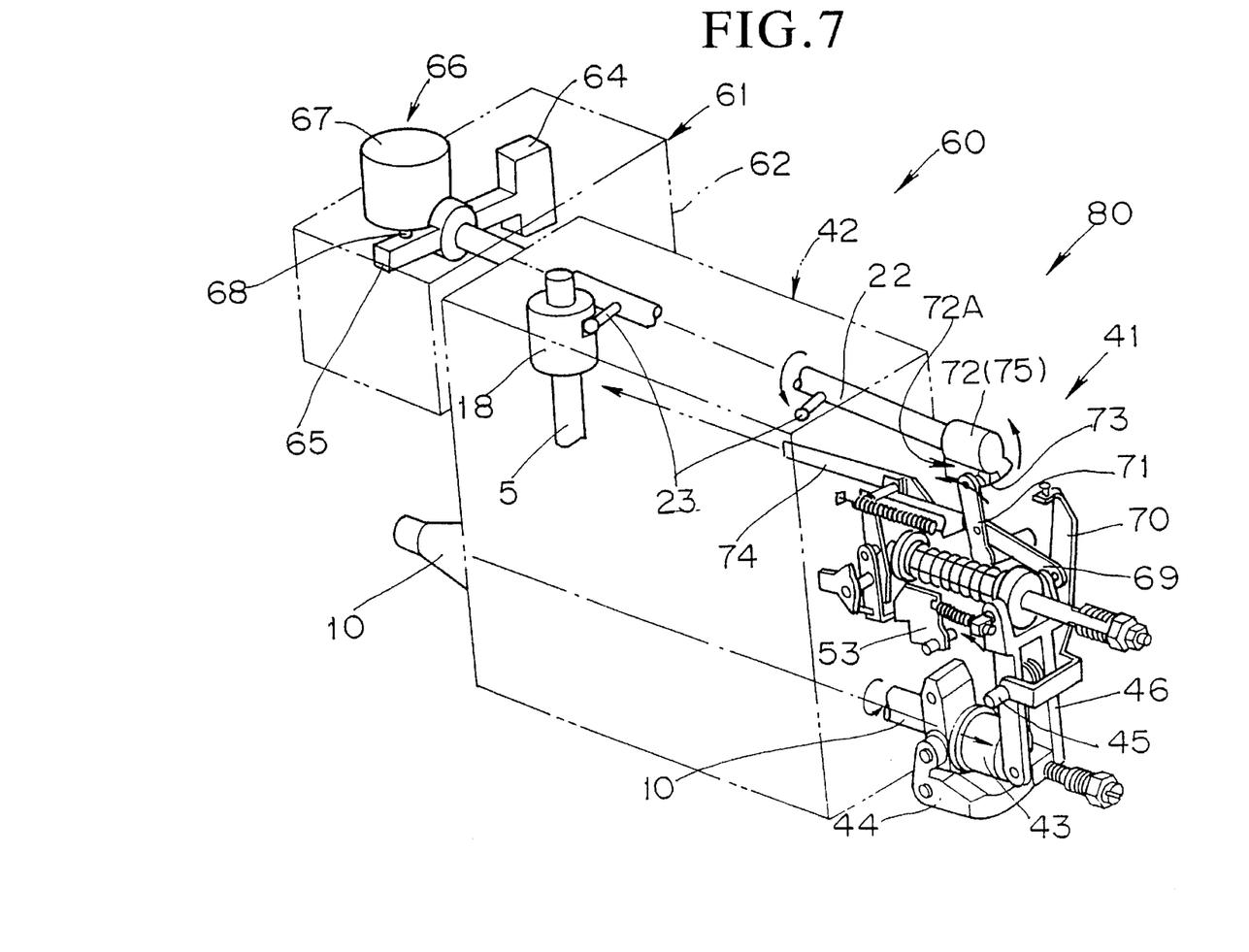
FIG. 7 is a schematic perspective view of a fuel injection pump system 60 equipped with another variable prestroke controller capable of mechanical prestroke control and including an in-line main pump unit 42, a variable prestroke controller 61 and a mechanical governor 41, this view being used to explain a second embodiment of the pilot injection controller 80 for a fuel injection system according to the invention.

FIG. 7 is a schematic perspective view of a fuel injection pump (fuel injection system) 60 equipped with another variable prestroke controller capable of mechanical prestroke control.

The fuel injection system 60 includes an in-line main pump unit 42, a variable prestroke controller 61 and a mechanical governor 41.

Figure 8:
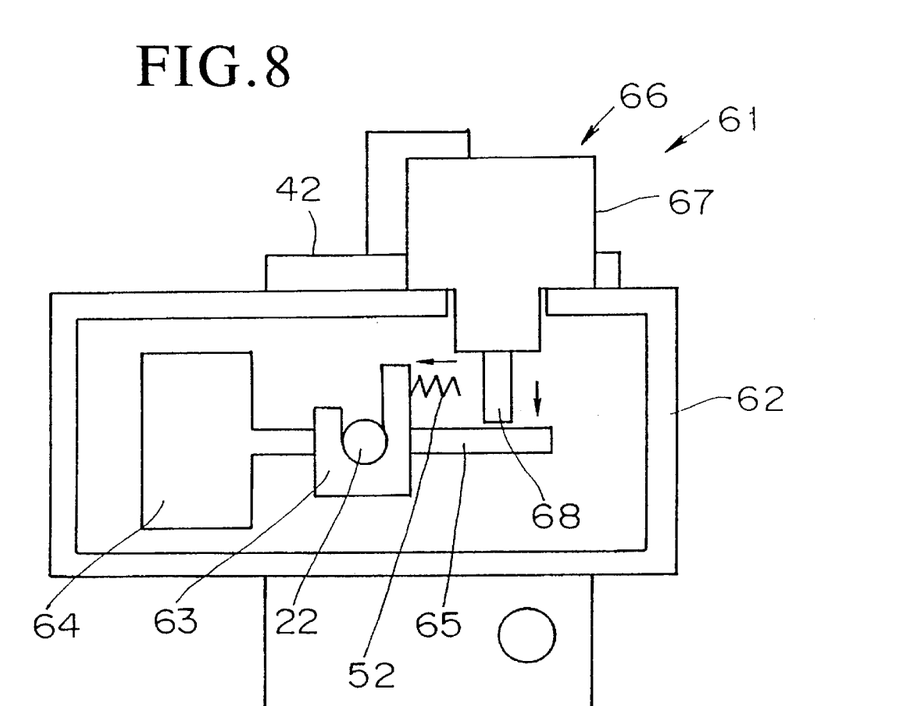
FIG. 8 is a sectional side view of the variable prestroke controller 61 as seen from the side of a counterweight case 62 opposite from that of the mechanical governor 41.

FIG. 8 is a sectional side view of the variable prestroke controller 61 as seen from the side of a counterweight case 62 opposite from that of the mechanical governor 41. The variable prestroke controller 61 comprises a U-shaped lever 63, a counterweight 64, an abutment lever 65 and an injection advance adjustment add-on device 66 positioned opposite the abutment lever 65.

The injection advance adjustment add-on device 66 has a device housing 67 and a control shaft 68. The control shaft 68 projects/retracts or moves with respect to the device housing 67 in response to changes in an engine operating condition such as the engine load or the degree of depression of the accelerator pedal or changes in the ambient temperature. Since the position at which the control shaft 68 abuts on the abutment lever 65 therefore changes accordingly, it is able to control (adjust) the prestroke by appropriately restricting the rotation of the timing control rod 22.

The counterweight 64 and the timing control rod 22 are constantly urged in the direction of injection timing retard by a compression return spring 52 acting thereon through the U-shaped lever 63.

On the mechanical governor 41 side of the prestroke controller 61, the prestroke can be controlled in accordance with the engine speed (pump speed) by co-utilizing the flyweight 44 of the mechanical governor 41.

More specifically, the tension lever 46 (similar to that shown in FIG. 4) has an intermediate link 69 and a guide lever 70 attached thereto, and a control lever 71 is attached to the intermediate link 69.

A cylindrical cam 72 is fitted on the end portion of the timing control rod 22 opposite the mechanical governor 41 and an abutment pin 73 of the control lever 71 is abutted on the cam surface 72A of the cylindrical cam 72.

In addition, an injection quantity control rack 74 is provided in association with a torque cam 53. The injection quantity control rack 74 controls the quantity of fuel injected by rotating the plunger 5 about its axis.

Figure 9:
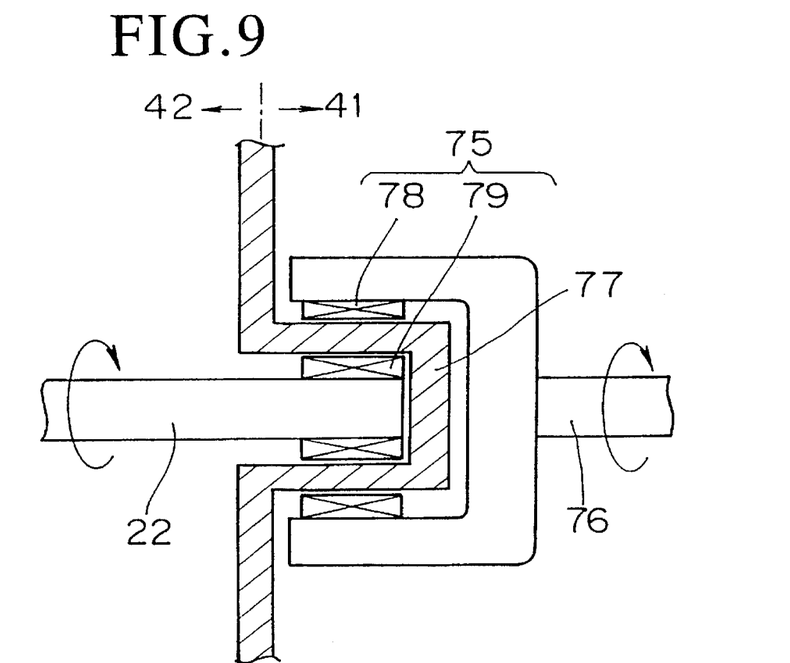
FIG. 9 is an enlarged view of an essential portion of a connection section (displacement transfer section) between the mechanical governor 41 and the main pump unit 42.

As shown in FIG. 9, a magnetic coupling 75 is built into the cylindrical cam 72 and the rotation of the cylindrical cam 72 is transferred to the timing control rod 22 through the magnetic coupling 75. The control sleeve 18 can therefore for be moved vertically with respect to the plunger 5 to adjust the prestroke in the manner explained earlier.

FIG. 9 is an enlarged view of an essential portion of a coupling for explaining the principle of the coupling (displacement transfer section) between the mechanical governor 41 and the main pump unit 42. Specifically, a displacement transfer shaft 76 (equivalent to the cylindrical cam 72) which receives the displacement of the flyweight 44 through the tension lever 46 and the like and transfers it to the timing control rod 22 is coupled with the timing control rod 22 by the magnetic coupling 75. The magnetic coupling 75 straddles a partition 77 which separates the timing control rod 22 from the displacement transfer shaft 76.

The magnetic coupling 75 has a driving side external magnet 78 located on an inner wall portion at the end of the displacement transfer shaft 76 and a driven side internal magnet 79. The rotation of the displacement transfer shaft 76 transmits through the magnetic coupling 75 to transfer a rotational force to the timing control rod 22.

The profile of the cam surface 72A of the cylindrical cam 72 is determined in light of the desired prestroke control characteristic. In the illustrated example it consists of a combination of a flat portion extending linearly from the side of the timing control rod 22 and an ensuing curved portion.

The variable prestroke controller 61 configured in the foregoing manner operates similarly to the variable prestroke controller 40 of FIG. 4 in the point that the movement of the flyweight 44 with increasing engine speed is used to rotate the tension lever 46 and, in turn, to rotate the intermediate link 69 and the control lever 71 in the direction of the arrow.

As a result, the abutment pin 73 pushes against the cam surface 72A of the cylindrical cam 72 to rotate the cylindrical cam 72 counterclockwise in FIG. 7 and the resulting rotation of the timing control rod 22 is transferred to the engagement member 23 which lowers the control sleeve 18, thereby shortening the prestroke and advancing the fuel injection timing.

The injection timing advance characteristic thus varies with the speed of the main pump unit 42 and is based on a so-called speed timer function. However, since the cylindrical cam 72 does not constitute a direct-acting mechanically connection but instead employs the magnetic coupling 75, it is possible for a separately provided add-on device to rotate timing control rod 22 independently of the engine speed.

More specifically, the control sleeve 18 can be lowered and the fuel injection timing advanced even before the flyweight 44 has moved sufficiently to rotate the cylindrical cam 72 because the timing control rod 22 can be independently rotated in the counterclockwise direction in FIG. 7 by extending the control shaft 68 of the injection advance adjustment add-on device 66.

The prestroke can therefore be controlled independently of the movement of the flyweight 44 with increasing engine speed.

The variable prestroke controller 61, the mechanical governor 41, the timing control rod 22, the control sleeve 18, the cam 11 etc. constitute a pilot injection controller 80 in the fuel injection pump system according to a second embodiment of this invention.

Figure 10:
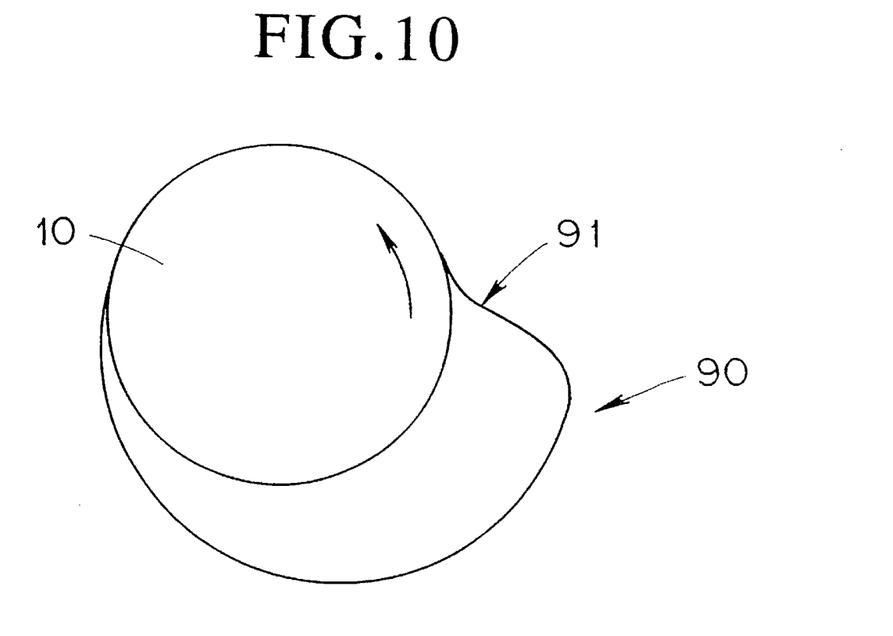
FIG. 10 is a diagram for explaining a concave cam 90.

If it is found necessary to further increase the ascending gradient of the cam velocity constant, it is possible according to this invention to adopt the concave cam 90 shown in FIG. 10 as the cam 11. The concave cam 90 is formed on the cam shaft 10 to have a concave surface portion 91.

Figure 11:
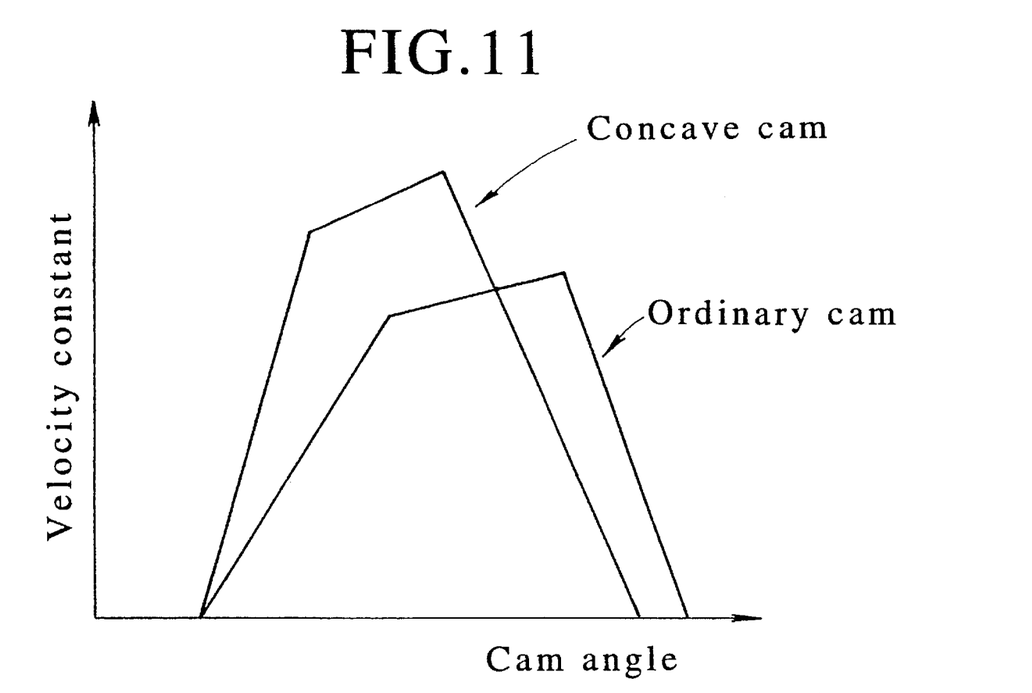
FIG. 11 is a graph showing the velocity constants of the concave cam 90 and an ordinary cam 11.

FIG. 11 is a graph similar to that of FIG. 5 showing the velocity constants of the concave cam 90 and the ordinary cam 11.

As will be noted from FIG. 11, use of the concave cam 90 makes it possible to obtain a steeper initial velocity constant gradient than can be obtained with the ordinary cam 11, meaning that a larger velocity constant portion can be utilized for one and the same cam angle.

Moreover, while the range of prestroke control is limited owing the physical restriction on the range within which the control sleeve 18 can be moved vertically with respect to the plunger 5 for variable control of the prestroke, use of the concave cam 90 provides a greater range of variable control than the ordinary cam 11.

Specifically, use of the concave cam 90 makes it possible to lower the prestroke and maintain the actual delivery velocity of the plunger 5 substantially constant even when the engine speed is high.

In the case of using the ordinary cam 11, the range within which an appropriate quantity of pilot-injected fuel can be obtained is, for example, 600–900 rpm. Use of the concave cam 90 expands this to 400–1000 rpm.

While the pilot injection controllers 54 and 80 described as the first and second embodiments of the invention in the foregoing control prestroke mechanically, the invention also enables electronic prestroke control.

Figure 12:
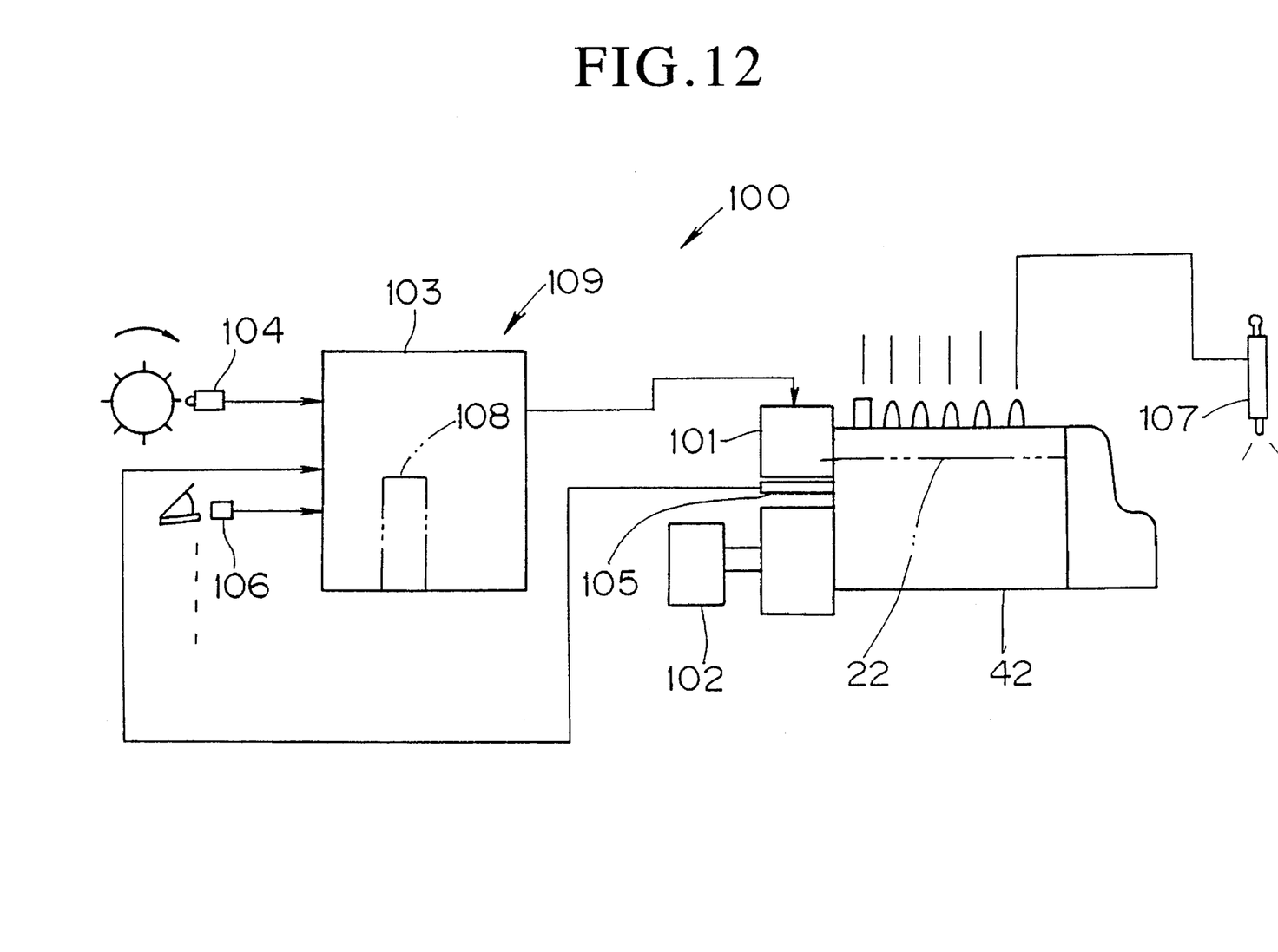
FIG. 12 is a schematic view of a fuel injection system 100 enabling electronic variable prestroke control in accordance with a third embodiment of the invention.

FIG. 12 is a schematic view of a fuel injection system 100 capable of variably controlling prestroke electronically. The fuel injection system 100 comprises a main pump unit 42, a variable prestroke actuator 101, a timer 102, an electronic control means 103, a speed sensor 104 and a rack sensor 105 or an accelerator sensor 106. Pressurized fuel delivered from the main pump unit 42 is injected from a fuel injection nozzle 107.

The variable prestroke actuator 101 is constituted as a step motor or the like for rotating a timing control rod similar to the timing control rod 22 in FIGS. 1, 4 and 7.

Figure 13:
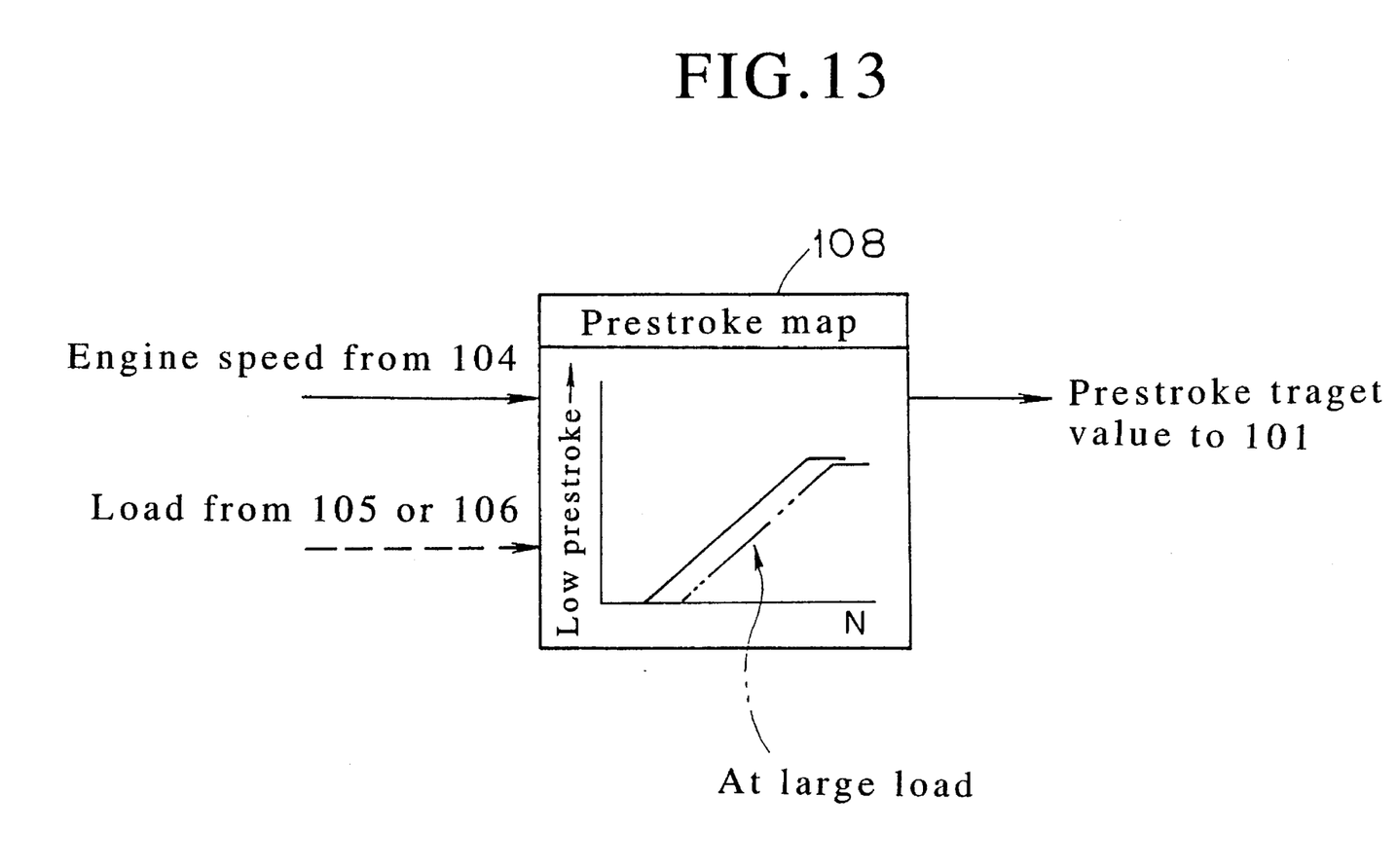
FIG. 13 is diagram for explaining a prestroke map 108.

The electronic control means 103 includes the prestroke map 108 shown in FIG. 13. In response to detection signals received from the speed sensor 104 and the rack sensor 105 or the accelerator sensor 106, it outputs an optimum prestroke target value to the variable prestroke actuator 101, thereby controlling the vertical position of the control sleeve 18 via the timing control rod 22 so as to adjust the prestroke.

If desired, the prestroke map 108 can be compensated for load. Specifically, compensation processing can be conducted for raising the prestroke level (as shown by the chain line in FIG. 13) in order to cope with the drop in residual pressure during high-load operation.

Since the prestroke control by the variable prestroke actuator 101 retards or advances the actual fuel injection timing, the timer 102 can be used to correct the timing as required at different engine speeds.

The variable prestroke actuator 101, the timer 102, the electronic control means 103, the speed sensor 104, the rack sensor 105 or accelerator sensor 106, the timing control rod 22 etc. constitute a pilot injection controller 109 in the fuel injection pump system according to a third embodiment of this invention.

As explained in the foregoing, this invention provides a fuel injection system having a fixed pilot injection plunger delivery stroke with a pilot injection controller which uses a variable prestroke controller to reduce the prestroke in the high-speed region and increase the prestroke in the low-speed region, thereby maintaining the quantity of pilot-injected fuel substantially constant irrespective of engine speed.

What is claimed is:

1. A pilot injection controller in a fuel injection system including a cam rotated by an engine, a plunger barrel with a fuel compression chamber, a plunger reciprocated inside the plunger barrel by the cam for sucking fuel into the fuel compression chamber from a fuel reservoir through a fuel suction and discharge hole and delivering the fuel under pressure and a control sleeve fitted over the plunger to be slidable thereon in an axial direction of the plunger, the plunger executing a pilot injection delivery stroke of fixed magnitude to pilot-inject fuel prior to main injection of fuel the pilot injection controller comprising means for adjusting prestroke by changing a positional relationship in the axial direction between the control sleeve and the plunger, and means for enabling the prestroke adjustment by the prestroke adjustment means to cause a portion of the cam in a lower delivery velocity region to be used with increasing rotational speed of the cam.

2. A pilot injection controller in a fuel injection system according to claim 1, wherein said prestroke adjustment means mechanically adjusts the prestroke by use of a variable prestroke controller.

3. A pilot injection controller in a fuel injection system according to claim 1, wherein said prestroke adjustment means electronically adjusts the prestroke by use of a timing control rod for operating the control sleeve and a variable prestroke actuator for driving the timing control rod.

4. A pilot injection controller in a fuel injection system according to claim 3, wherein the variable prestroke actuator is controlled by an electronic control means having a prestroke map for controlling the prestroke.

5. A pilot injection controller in a fuel injection system according to claim 4, wherein the electronic control means conducts processing to compensate the prestroke map for engine load.

6. A pilot injection controller in a fuel injection system according to claim 1, wherein the prestroke adjustment by the prestroke adjustment means varies a velocity constant of the cam.

7. A pilot injection controller in a fuel injection system according to claim 1, wherein the prestroke is adjusted to a smaller value with increasing engine speed.

8. A pilot injection controller in a fuel injection system according to claim 1, wherein a velocity constant of the cam is increased when the engine is operating in a low-speed region and the velocity constant of the cam is reduced with the engine is operating in a high-speed region.

9. A pilot injection controller in a fuel injection system according to claim 1, wherein the delivery velocity region of the plunger is maintained substantially constant by selecting an appropriate combination of engine speed and velocity constant or utilized velocity range of the cam.

10. A pilot injection controller in a fuel injection system according to claim 1, wherein the plunger is formed in its outer surface with an inclined control groove for communicating with the fuel suction and discharge hole thereof, the control sleeve is formed with a main injection cutoff port at a position aligned with the inclined control groove in the axial direction of the plunger, the plunger is formed in its outer surface with a pilot spill slit extending annularly over a prescribed length at a position below both the fuel suction and discharge hole and the inclined control groove of the plunger for communicating with at least one of the fuel suction and discharge hole and the inclined control groove, and the control sleeve is formed separately of the main injection cutoff port with a pilot injection cutoff port at a position aligned with the pilot spill slit in the axial direction of the plunger.

11. A pilot injection controller in a fuel injection system according to claim 10, wherein the delivery stroke for pilot injection is fixed at a length (H2–H1) obtained by subtracting width H1 of the pilot spill slit from distance H2 between a lower edge of the control sleeve and a lower edge of the pilot injection cutoff port.

12. A pilot injection controller in a fuel injection system according to claim 1, wherein the cam is a concave cam.

13. A pilot injection controller in a fuel injection system according to claim 1, wherein the means for adjusting the prestroke is a variable prestroke controller having a flyweight which moves in response to engine speed, a prestroke control lever which rotates in response to movement of the flyweight, a timing cam connected with the prestroke control lever and having a prestroke adjustment cam surface, a counterweight connected with a timing control rod operable for changing a positional relationship in the axial direction between the control sleeve and the plunger, and a cam surface abutment piece formed on the counterweight, the cam surface abutment piece being held in contact with the cam surface of the timing cam at a prescribed pressure.

14. A pilot injection controller in a fuel injection system according to claim 1, wherein the means for adjusting the prestroke is a variable prestroke controller having an injection advance adjustment add-on device capable of adjusting the prestroke by limiting rotation of a timing control rod in response to an engine operating condition such as engine load or degree of depression of an accelerator pedal or to ambient temperature.

15. A pilot injection controller in a fuel injection system according to claim 1, wherein the means for adjusting the prestroke is a variable prestroke controller having a flyweight which moves in response to engine speed, a prestroke control lever which rotates in response to movement of the flyweight, a cylindrical cam having a prestroke adjustment cam surface and connected with a timing control rod operable for changing a positional relationship in the axial direction between the control sleeve and the plunger, a magnetic coupling provided in the cylindrical cam, and an abutment pin abutting on the cam surface of the cylindrical cam and connected with the tension lever, the abutment pin being held in contact with the cam surface of the cylindrical cam at a prescribed pressure.

16. A method of controlling pilot injection quantity in a fuel injection pump system including a cam rotated by an engine, a plunger barrel with a fuel compression chamber, a plunger reciprocated inside the plunger barrel by the cam for sucking fuel into the fuel compression chamber from a fuel reservoir through a fuel suction and discharge hole and delivering the fuel under pressure and a control sleeve fitted over the plunger to be slidable thereon in an axial direction of the plunger, the plunger executing a pilot injection delivery stroke of fixed magnitude to pilot-inject fuel prior to main injection of fuel the method comprising a step of adjusting prestroke by changing a positional relationship in the axial direction between the control sleeve and the plunger, and a step of enabling the prestroke adjustment to cause a portion of the cam in a lower delivery velocity region to be used with increasing rotational speed of the cam.

17. A method of controlling pilot injection quantity in a fuel injection pump system according to claim 16, wherein change in fuel injection timing caused by the prestroke adjustment is compensated for by a timer.

* * * * *